Patented Feb. 3, 1953

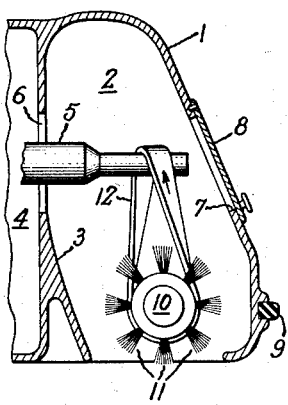
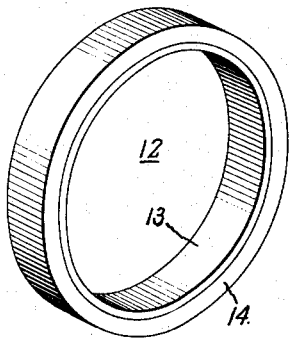
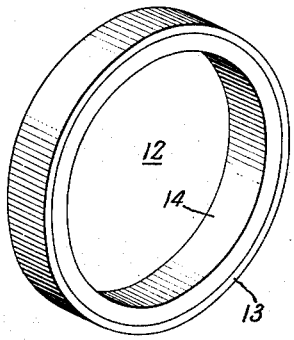
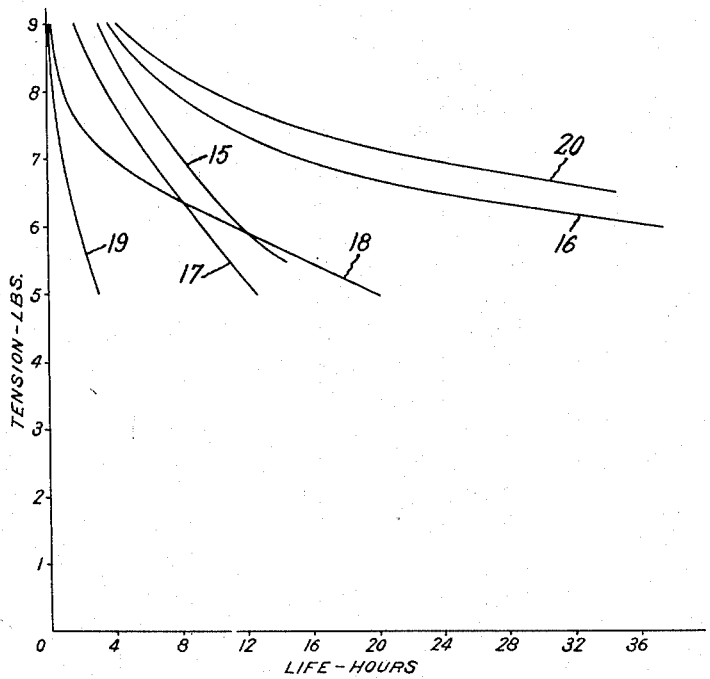
Inventors:
George H. Bramhall,
James P. Hunter,
Their Attorney.

2,627,185

UNITED STATES PATENT OFFICE 2,627,185

TRANSMISSION BELT

George H. Bramhall, Cleveland, and James P. Hunter, Eastlake, Ohio, assignors to General Electric Company, a corporation of New York Application August 25, 1949, Serial No. 112,207

2 Claims. (Cl. 74—232)

This invention relates to a flexible belt for transmission of power from a driving shaft to a driven member, and more particularly to a rubber belt and the method of manufacture thereof.

An object of our invention is to provide an improved rubber belt for power transmission which has a longer operating life. More specifically, an object of our invention is to provide a rubber belt for transmission of power from the motor shaft of a suction cleaner to the rotary brush mounted in the mouth of the cleaner nozzle.

A further object of our invention is to provide a belt for a suction cleaner which does not mark any material coming in contact with the rapidly moving belt surface during operation.

Another object of our invention is to construct a power transmission belt which clearly indicates when a belt is being operated inside out with respect to the position in which the belt is manufactured, so that the maximum belt life is obtained.

In accomplishment of the foregoing objectives, a feature of our invention consists in fabricating a power transmission belt with a thin layer of white rubber on the inside and the main body of black rubber on the outside. When the belt is used in connection with a suction cleaner, the belt is turned inside out to take advantage of the high wear and abrasion resistance of the black rubber, while presenting a nonmarking white rubber exposed surface which forms a layer of high resilience.

The features of our invention which we believe to be novel are set forth with particularity in the appended claims. Our invention itself, however, both as to its organization and method of operation, together with further objects and advantages thereof, may best be understood by reference to the following description taken in connection with the accompanying drawing, in which Fig. 1 is a cross-sectional view of a suction cleaner nozzle with our improved belt in position; Fig. 2 is a perspective view of this belt as formed; Fig. 3 is a perspective view of a finished belt as used; and Fig. 4 is a graphic representation of belt characteristics.

In Fig. 1 of the drawing, we have shown our invention embodied in the suction nozzle of a vacuum cleaner. It is obvious, however, that this invention is not limited solely to this application, our improved rubber belt being equally applicable to other uses requiring a flexible power transmission belt. In the specific embodiment shown, wall 1 forms a nozzle and defines a nozzle suction chamber 2 for a conventional floor type cleaner. An internal wall 3 separates suction chamber 2 from the motor and fan compartment 4. Motor shaft 5 extends horizontally through an aperture 6 of wall 3 and into nozzle suction chamber 2. The front surface of wall 1 is centrally apertured at 7 to provide access into the nozzle suction chamber, and a door or cover 8 normally closes aperture 7. A suitable rubber bumper 9 is mounted on the lower part of wall 1 to avoid marring objects of furniture when the cleaner is in use.

To aid in the cleaning operation and loosen dust and dirt, we employ a rotary brush or agitator mounted in the mouth of suction chamber 2. This rotary agitator is shown as a spindle 10, rotatably mounted with respect to the nozzle wall, and bristles 11 projecting outwardly from the spindle. Spindle 10 is driven by belt 12 which passes over an end of shaft 5. Shaft 5 rotates clockwise, looking at the outer end of the shaft, so that the motion of the belt will be as shown by the arrow. It is apparent that this application requires a flexible belt having an inner surface with a high abrasion resistance frictionally engaging shaft 5. We have found rubber belts most suitable for this purpose, and in particular rubber belts made from a rubber having a high proportion of soft carbon black for filler. Such a filler increases materially the tear and abrasion resistance. However, because of the high percentage of carbon black in the belt, the belt itself is black. Since belt 12 runs around spindle 10, there is a probability of contact between the belt and material which is being cleaned, since such material may be drawn up by the cleaner suction into the mouth of the nozzle. Such contact between the moving belt and the material being cleaned may cause objectionable black marks on the material, which obviously is unsatisfactory.

Fig. 2 illustrates the form in which our improved belt 12 is made. This belt includes an inner layer 13 of white rubber and an outer layer 14 of black rubber. White rubber for layer 13 is processed from a high grade raw rubber with the usual compounding materials, such as sulfur and plasticizers, and includes an active filler, such as zinc oxide, to increase its resilience. However, any suitable materials other than zinc oxide may be used for this purpose. We prefer to employ an active filler, which not only improves the characteristics of natural rubber, but which also acts as a pigment so that the resulting mix will have a white, nonmarking color. In addition, other pigments may be added to this rubber to obtain the desirable white color. A typical example of such pigmenting material is titanium dioxide which may be mixed with the natural rubber along with the other compounding constituents. The outer layer 14 of this belt is of the usual black rubber resulting from a mixture with natural rubber of soft carbon blacks in addition to the usual vulcanizing and processing components. While there may be many methods of forming this belt to the desired size and shape, we find it convenient to first wrap a thin layer of uncured white rubber around a mandrel. The thicker layer of black rubber is then wrapped around the outside of the white rubber layer. By the familiar process of vulcanization, the white and black rubber are cured and at the same time both the white and black portions are bonded together to form a continuous cylinder. Appropriate widths may be cut from this cylinder, resulting in the completed belt shown by Fig. 2.

Practical experience demonstrates that a rubber belt has a much longer life if it is turned inside out from the form in which it was manufactured. Fig. 3 illustrates the belt shown by Fig. 2 turned inside out so that the thin layer of white rubber 13 is on the outside and the black rubber layer 14 is on the inside. By turning the belt inside out, the inside surface of the black rubber is placed under compression, tending to increase its resistance to abrasion. At the same time, the outside white rubber layer is placed under tension. The high resistance or ability to withstand fatigue of the white rubber results in a belt which retains its tension over a longer period of time, thus prolonging useful belt life. The belt shown by Fig. 3 is ready for installation in the suction cleaner, as shown by Fig. 1.

Belt characteristics for this application are graphically illustrated by Fig. 4. In this figure, the ordinate scale is in pounds static tension in the belt measured as the force tending to separate the driving shaft from the spindle. The belt is tested by actual operation in a cleaner at the intended rotative speed for a period of time measured along the abscissa scale. At the end of a given period of time, measurement is made of the tension that the belt maintains. This value of belt tension is plotted on the graph as the ordinate corresponding to the hours operated. It is found that a belt is no longer effective when its tension decreases below a predetermined minimum value, for example, five pounds. Therefore, hours of operation corresponding to this predetermined minimum tension gives a test indication of belt life.

Tests as indicated above were performed for six different samples: Belt sample 15 is a plain black rubber belt operated in the cleaner in the same position in which formed. Sample 16 is an identical solid black rubber belt operated in the cleaner inside out from the position in which formed. Sample 17 is a belt formed as described above but with a thin layer of white rubber on the outside and black rubber on the inside. The total belt thickness is, of course, identical, although the thickness of the black rubber layer is reduced by an amount corresponding to the thickness of the added layer of white rubber. Sample 17 was operated in the cleaner as formed. Sample 18 is a belt identical to sample 17, but operated in the cleaner inside out from the position in which formed, that is, with the white rubber layer in contact with the motor shaft and spindle. Samples 19 and 20 are belts formed as described above with the white rubber layer on the inside and the black rubber layer on the outside. Sample 19 was operated in the cleaner as formed, whereas sample 20 was turned inside out. From these test results it is evident that belt life is prolonged in each instance by turning the belt inside out, as represented by samples 16, 18, and 20. Furthermore, these tests clearly illustrate that when a white rubber surface is placed in contact with the motor shaft and brush spindle, a poor life characteristic results due to the low abrasion resistance of the white rubber. For example, in sample 19 formed with the white rubber on the inside and operated in the same manner a very poor life characteristic results. Sample 18, formed with the white rubber on the outside and then operated inside out with the white rubber subjected to the abrasion resistance during operation, also illustrates a relatively poor characteristic. As illustrated by Fig. 4, however, sample 20 is the most satisfactory belt, being superior to a plain black rubber belt operated inside out as represented by sample 16. Sample 20, representing our improved belt, takes full advantage of the desirable characteristics of both types of rubber. It is formed with the white rubber on the outside and the black rubber on the inside and turned inside out prior to operation, thus placing the black rubber under compression and the white rubber under tension. By operating the belt with the black rubber subjected to the abrasion, its high abrasion resistance is utilized to provide a belt of maximum life. The addition of the layer of white rubber on the outside of the belt prolongs belt life because of its higher resilience or ability to withstand fatigue. Therefore, sample 20 is superior to the plain black rubber belt represented by sample 16.

Obviously, our invention is not limited solely to a rubber belt formed with a layer of white rubber bonded to a layer of black rubber, although this construction is our preferred embodiment. However, an improved belt within our invention may also be made by coating a black rubber core with a white rubber solution to provide a nonmarking belt. Also, dyes, paints, or other pigmenting materials may be employed to result in a long-wearing black rubber belt with a white non-marking exposed surface.

From the above disclosure, it is seen that we have provided an improved rubber belt for transmission of power which has an increased life under operating conditions. Our improved belt also has the advantage of presenting a surface which will not mark or mar a surface of material being cleaned. In addition, this belt clearly and unmistakably identifies which side of the belt should be placed next to the driving shaft and spindle for longest life by means of the color difference of the two layers of rubber making up the belt.

While the present invention has been described by reference to particular embodiments thereof, it will be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. An endless flat rubber belt for transmission of power comprising a layer of white rubber of high resilience, and a layer of black rubber of high abrasion resistance, said layers being bonded together into a belt with said white layer innermost, and said belt being turned inside out for use, whereby said white layer presents a non-marking, easily identified exposed outer surface in use.

2. An endless flat rubber belt for transmission of power comprising a highly resilient outer layer of light colored non-marking rubber under tension, and a highly abrasion resistant inner layer of dark colored rubber under compression, said layers being bonded together into a unitary belt of rectangular cross-section, whereby said outer layer presents an easily identified surface.

GEORGE H. BRAMHALL.
JAMES P. HUNTER.

REFERENCES CITED

The following references are of record in the file of this patent:

UNITED STATES PATENTS

| Number | Name | Date |
|---|---|---|
| 1,479,032 | Egerton | Jan. 1, 1924 |
| 1,624,939 | Osius | Apr. 19, 1927 |
| 1,924,083 | Carter et al. | Aug. 22, 1933 |
| 1,969,067 | Freeman | Aug. 7, 1934 |
| 2,140,692 | Daly | Dec. 20, 1938 |
| 2,256,756 | Brown | Sept. 23, 1941 |
| 2,417,512 | Nassimbene | Mar. 18, 1947 |
| 2,442,037 | Carter et al. | May 25, 1948 |
| 2,515,778 | Knowland | July 18, 1950 |